United States Patent
Wu (10) Patent No.: US 10,320,452 B2
(45) Date of Patent: Jun. 11, 2019

(54) METHOD AND APPARATUS FOR FEEDING BACK INFORMATION ABOUT CHANNEL BETWEEN ANTENNA ARRAYS

(71) Applicant: HUAWEI TECHNOLOGIES CO., LTD., Shenzhen (CN)

(72) Inventor: Ye Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,617

(22) Filed: Nov. 17, 2017

(65) Prior Publication Data
US 2018/0076858 A1 Mar. 15, 2018

Related U.S. Application Data

(63) Continuation of application No. PCT/CN2015/079290, filed on May 19, 2015.

(51) Int. Cl.
*H04B 7/0417* (2017.01)
*H04B 17/309* (2015.01)
(Continued)

(52) U.S. Cl.
CPC ......... *H04B 7/0417* (2013.01); *H04B 7/0452* (2013.01); *H04B 7/0473* (2013.01);
(Continued)

(58) Field of Classification Search
CPC .. H04B 7/0417; H04B 7/0874; H04B 7/0691; H04B 7/0473; H04B 7/0452;
(Continued)

(56) References Cited

U.S. PATENT DOCUMENTS

2009/0268827 A1* 10/2009 Clerckx ............... H04B 7/0639
  375/260
2014/0011468 A1 1/2014 Park et al.
(Continued)

FOREIGN PATENT DOCUMENTS

CN 101272167 A 9/2008
CN 103152140 A 6/2013
(Continued)

OTHER PUBLICATIONS

Schwarz, et al. "Calculation of the Spatial Preprocessing and Link Adaption Feedback for 3GPP UMTS/LTE" Institute of Electrical and Electronics Engineers, New York, New York (2010).

*Primary Examiner* — Vineeta S Panwalkar
(74) *Attorney, Agent, or Firm* — Leydig, Voit & Mayer, Ltd.

(57) ABSTRACT

A method for feeding back information about a channel between antenna arrays is provided, which includes: receiving, by a first network device, channel information of N×M sub-channels that is sent by a second network device, where an antenna array of the first network device includes M subarrays, an antenna array of the second network device includes N subarrays, a channel between the antenna array of the first network device and the antenna array of the second network device includes the N×M sub-channels, M and N are positive integers and are not both 1, and the M subarrays and the N subarrays each include at least two antennas; and generating channel information of the channel between the antenna array of the first network device and the antenna array of the second network device according to the channel information of the N×M sub-channels that is from the second network device.

16 Claims, 4 Drawing Sheets

(51) Int. Cl.
*H04B 7/0452* (2017.01)
*H04B 7/06* (2006.01)
*H04B 7/0456* (2017.01)
*H04B 7/08* (2006.01)
*H04L 5/00* (2006.01)

(52) U.S. Cl.
CPC ......... *H04B 7/0626* (2013.01); *H04B 7/0639* (2013.01); *H04B 7/0691* (2013.01); *H04B 7/0874* (2013.01); *H04B 17/309* (2015.01); *H04L 5/0048* (2013.01)

(58) Field of Classification Search
CPC .. H04B 7/0626; H04B 7/0639; H04B 17/309; H04L 5/0048
See application file for complete search history.

(56) References Cited

U.S. PATENT DOCUMENTS

| | | | |
|---|---|---|---|
| 2014/0098689 A1 | 4/2014 | Lee et al. | |
| 2014/0205036 A1 | 7/2014 | Kim | |
| 2016/0080058 A1* | 3/2016 | Kang | H04B 7/0617 370/329 |

FOREIGN PATENT DOCUMENTS

| | | |
|---|---|---|
| EP | 2899896 A1 | 7/2015 |
| EP | 2993804 A1 | 3/2016 |
| WO | 2013124762 A1 | 8/2013 |
| WO | 2014046429 A1 | 3/2014 |
| WO | 2014168315 A1 | 10/2014 |
| WO | 2014178648 A1 | 11/2014 |
| WO | 2014194525 A1 | 12/2014 |

\* cited by examiner

METHOD AND APPARATUS FOR FEEDING BACK INFORMATION ABOUT CHANNEL BETWEEN ANTENNA ARRAYS

CROSS-REFERENCE TO RELATED APPLICATIONS

This application is a continuation of International Application No. PCT/CN2015/079290, filed on May 19, 2015, the entire content of which is hereby incorporated by reference in its entirety.

TECHNICAL FIELD

Embodiments of the present disclosure relate to the communications field, and more specifically, to a method and an apparatus for feeding back information about a channel between antenna arrays.

BACKGROUND

In a Long Term Evolution (Long Term Evolution, LTE) system and its subsequent evolution, a quantity of antennas at a data transmit end increases rapidly, and a quantity of user equipments (UEs) that need to be served also increases rapidly. An increase in the quantity of antennas can provide a higher spatial degree of freedom, thereby creating an advantageous condition for multiplexing multiple data streams in downlink space (for example, single user multiple-input multiple-output (SU-MIMO) or multi-user multiple-input multiple-output (MU-MIMO)). Downlink channel state information (CSI) measurement is classified into two types: obtaining instantaneous CSI, for example, a channel; and obtaining statistical CSI, for example, a channel autocorrelation matrix. A function of a massive MIMO system lies more in statistically performing channel processing, including dimension reduction and grid of beam (GOB).

SUMMARY

Embodiments of the present disclosure provide a method and an apparatus for feeding back information about a channel between antenna arrays, so as to reduce complexity of obtaining channel information of a channel between antenna arrays of different network devices.

According to a first aspect, an example of the present disclosure provides a method for feeding back information about a channel between antenna arrays, including:
receiving, by a first network device, channel information of the N×M sub-channels that is sent by a second network device, where an antenna array of the first network device includes M subarrays, an antenna array of the second network device includes N subarrays, a channel between the antenna array of the first network device and the antenna array of the second network device includes the N×M sub-channels, M and N are positive integers and are not both 1, and the M subarrays and the N subarrays each include at least two antennas; and
generating channel information of the channel between the antenna array of the first network device and the antenna array of the second network device according to the channel information of the N×M sub-channels that is from the second network device.

In a first possible implementation of the first aspect, channel information of the N×M sub-channels includes a rank indicator RI and a precoding matrix indicator PMI, each of the N×M sub-channels corresponds to one sub-channel matrix, and the channel information of the N×M sub-channels is obtained according to the following steps:
obtaining autocorrelation matrices of sub-channel matrices corresponding to the N×M sub-channels; and
obtaining the RI and the PMI of the N×M sub-channels according to the autocorrelation matrices of the channel matrices of the N×M sub-channels.

In a second possible implementation of the first aspect, the channel information of the N×M sub-channels includes precoding, each of the N×M sub-channels corresponds to one sub-channel matrix, and the channel information of the N×M sub-channels is obtained according to the following steps:
obtaining autocorrelation matrices of sub-channel matrices corresponding to the N×M sub-channels; and
obtaining the precoding of the N×M sub-channels according to the autocorrelation matrices of the channel matrices of the N×M sub-channels.

In a third possible implementation of the first aspect, the method for feeding back information about a channel between antenna arrays further includes:
sending, by the first network device, subarray configuration information to the second network device, where the subarray configuration information is used to divide the antenna array of the first network device into the M subarrays, and M is a positive integer greater than or equal to 2.

With reference to the third possible implementation of the first aspect, in a fourth possible implementation of the first aspect, the subarray configuration information includes at least one pattern, and the M subarrays are determined according to the at least one pattern.

With reference to the third possible implementation of the first aspect, in a fifth possible implementation of the first aspect, the subarray configuration information includes a start port number of each subarray, and each of the M subarrays is determined according to the start port number.

With reference to the third possible implementation of the first aspect, in a sixth possible implementation of the first aspect, the subarray configuration information is sent by using a physical downlink control channel PDCCH, Radio Link Control RLC signaling, or a physical broadcast channel PBCH.

According to a second aspect, an example of the present disclosure provides another method for feeding back information about a channel between antenna arrays, including:
generating, by a second network device, channel information of N×M sub-channels of a channel between an antenna array of a first network device and an antenna array of the second network device, where the antenna array of the first network device includes M subarrays, the antenna array of the second network device includes N subarrays, M and N are positive integers and are not both 1, and the M subarrays and the N subarrays each include at least two antennas; and
sending the channel information of the N×M sub-channels to the first network device, so that the first network device generates channel information of the channel between the antenna array of the first network device and the antenna array of the second network device according to the channel information of the N×M sub-channels.

In a first possible implementation of the second aspect, the channel information includes a rank indicator RI and a precoding matrix indicator PMI, each of the N×M sub-channels corresponds to one sub-channel matrix, and the channel information of the N×M sub-channels is obtained according to the following steps:

obtaining autocorrelation matrices of channel matrices of the N×M sub-channels; and obtaining the RI and the PMI of the N×M sub-channels according to the autocorrelation matrices of the channel matrices of the N×M sub-channels.

In a second possible implementation of the second aspect, the channel information of the N×M sub-channels includes precoding, each of the N×M sub-channels corresponds to one sub-channel matrix, and the generating, by a second network device, channel information of N×M sub-channels of a channel between an antenna array of a first network device and an antenna array of the second network device specifically includes:

obtaining autocorrelation matrices of channel matrices of the N×M sub-channels; and obtaining the precoding of the N×M sub-channels according to the autocorrelation matrices of the channel matrices of the N×M sub-channels.

In a third possible implementation of the second aspect, the method further includes:

receiving, by the second network device, subarray configuration information sent by the first network device, where the subarray configuration information is used to divide the antenna array of the first network device into the M subarrays, and M is a positive integer greater than 2.

With reference to the third possible implementation of the second aspect, in a fourth possible implementation of the second aspect, the subarray configuration information includes at least one pattern, and the N subarrays are determined according to the at least one pattern.

With reference to the third possible implementation of the second aspect, in a fifth possible implementation of the second aspect, the subarray configuration information includes a start port number of each subarray, and the M subarrays are determined according to the start port number of each subarray.

With reference to the third possible implementation of the second aspect, in a sixth possible implementation of the second aspect, the subarray configuration information is sent by using a physical downlink control channel PDCCH, Radio Link Control RLC signaling, or a physical broadcast channel PBCH.

According to a third aspect, an example of the present disclosure provides an apparatus for feeding back information about a channel between antenna arrays, including:

a receiving module, configured to receive channel information of the N×M sub-channels that is sent by the second network device, where an antenna array of the first network device includes M subarrays, an antenna array of the second network device includes N subarrays, a channel between the antenna array of the first network device and the antenna array of the second network device includes the N×M sub-channels, M and N are positive integers and are not both 1, and the M subarrays and the N subarrays each include at least two antennas; and a processing module, configured to generate channel information of the channel between the antenna array of the first network device and the antenna array of the second network device according to the channel information of the N×M sub-channels that is from the receiving module.

In a first possible implementation of the third aspect, the sending module is configured to send subarray configuration information to the second network device, the subarray configuration information is used to divide the antenna array of the first network device into the M subarrays, and M is a positive integer greater than or equal to 2.

With reference to the first possible implementation of the third aspect, in a second possible implementation of the third aspect, the subarray configuration information includes at least one pattern, and the M subarrays are determined according to the at least one pattern.

With reference to the first possible implementation of the third aspect, in a third possible implementation of the third aspect, the subarray configuration information includes a start port number of each subarray, and the M subarrays are determined according to the start port number of each subarray.

With reference to the first possible implementation of the third aspect, in a fourth possible implementation of the third aspect, the subarray configuration information is sent by using a physical downlink control channel PDCCH, Radio Link Control RLC signaling, or a physical broadcast channel PBCH.

According to a fourth aspect, an example of the present disclosure provides an apparatus for feeding back information about a channel between antenna arrays, where the channel information feedback apparatus includes:

a processing module, configured to generate channel information of N×M sub-channels of a channel between an antenna array of a first network device and an antenna array of the second network device, where the antenna array of the first network device includes M subarrays, the antenna array of the second network device includes N subarrays, M and N are positive integers and are not both 1, and the M subarrays and the N subarrays each include at least two antennas; and a sending module, configured to send the channel information of the N×M sub-channels to the first network device, so that the first network device generates channel information of the channel between the antenna array of the first network device and the antenna array of the second network device according to the channel information of the N×M sub-channels.

In a first possible implementation of the fourth aspect, the channel information includes a rank indicator RI and a precoding matrix indicator PMI, each of the N×M sub-channels corresponds to one sub-channel matrix, and the processing module is specifically configured to:

obtain autocorrelation matrices of channel matrices of the N×M sub-channels; and obtain the RI and the PMI of the N×M sub-channels according to the autocorrelation matrices of the channel matrices of the N×M sub-channels.

In a second possible implementation of the fourth aspect, the channel information of the N×M sub-channels includes a rank indicator RI and a precoding matrix indicator PMI, each of the N×M sub-channels corresponds to one sub-channel matrix, and the processing module is specifically configured to:

obtain autocorrelation matrices of channel matrices of the N×M sub-channels; and obtain the RI and the PMI of the N×M sub-channels according to the autocorrelation matrices of the channel matrices of the N×M sub-channels.

In a third possible implementation of the fourth aspect, the apparatus for feeding back information about a channel between antenna arrays further includes:

a receiving module, configured to receive subarray configuration information sent by the first network device, where the subarray configuration information is used to divide the antenna array of the first network device into the M subarrays, and M is a positive integer greater than or equal to 2.

With reference to the third possible implementation of the fourth aspect, in a fourth possible implementation of the fourth aspect, the subarray configuration information includes at least one pattern, and the N subarrays are determined according to the at least one pattern.

With reference to the third possible implementation of the fourth aspect, in a fifth possible implementation of the fourth aspect, the subarray configuration information includes a start port number of each subarray, and the M subarrays are determined according to the start port number of each subarray.

With reference to the third possible implementation of the fourth aspect, in a sixth possible implementation of the fourth aspect, the subarray configuration information is sent by using a physical downlink control channel PDCCH, Radio Link Control RLC signaling, or a physical broadcast channel PBCH.

BRIEF DESCRIPTION OF DRAWINGS

To describe the technical solutions in the examples of the present disclosure more clearly, the following briefly describes the accompanying drawings required for describing the examples. Apparently, the accompanying drawings in the following description show merely some examples of the present disclosure, and a person of ordinary skill in the art may still derive other drawings from these accompanying drawings without creative efforts.

DETAILED DESCRIPTION

Sometimes, when a massive antenna system performs channel measurement, CSI obtaining mainly relies on downlink measurement and user equipment (UE) feedback. UE obtains space precoding according to downlink channel information, quantizes the space precoding according to a preset precoding codebook, and then feeds back quantized space precoding to a base station. In an existing system, a quantity of antennas is relatively small, and complexity of obtaining space precoding is acceptable. However, in an MU-MIMO scenario, there are tens of or even more antennas. Because obtaining precoding requires eigenvalue decomposition on a channel matrix or on a channel autocorrelation matrix, complexity of obtaining space precoding is excessively high, leading to excessively high complexity of obtaining channel information. Therefore, how to reduce the complexity of obtaining channel information becomes a problem that urgently needs to be resolved.

In the examples of the present disclosure, an antenna array of a first network device and an antenna array of a second network device are divided into multiple antenna subarrays, channel information of multiple sub-channels that correspond to the multiple antenna subarrays and that are between the antenna array of the first network device and the antenna array of the second network device is obtained, and channel information of a channel between the antenna array of the first network device and the antenna array of the second network device is obtained according to the channel information of the multiple sub-channels. In this way, complexity of obtaining channel information is reduced, and efficiency of channel information feedback is improved.

The following describes the technical solutions in the examples of the present disclosure with reference to the accompanying drawings in the examples of the present disclosure. Apparently, the described examples are some but not all of the examples of the present disclosure. All other examples obtained by a person of ordinary skill in the art based on the examples of the present disclosure without creative efforts shall fall within the protection scope of the present disclosure.

To facilitate understanding of the technical solutions in the examples of the present disclosure, first, several related concepts are introduced herein.

(1) Antenna

An antenna is an electronic device configured to transmit or receive a radio wave or an electromagnetic wave. Physically, an antenna is a conductor or a combination of multiple conductors. From the antenna, a radiating electromagnetic field can be generated due to applied alternating voltage and associated alternating current. Alternatively, the antenna may be placed between electromagnetic waves. In this case, because of field induction, alternating current is generated inside the antenna, and alternating voltage is generated at a terminal of the antenna. A bandwidth of an antenna means a frequency range in which the antenna works effectively.

(2) Antenna Array

Directivity of a single antenna is limited. For application in various scenarios, two or more single antennas that work at a same frequency are fed with electricity and arranged spatially according to a specific requirement, thereby constituting an antenna array, also referred to as an antenna array. Antenna radiation units that constitute the antenna array are referred to as array elements.

A working principle of the antenna array may be regarded as superposition of electromagnetic waves. When several electromagnetic waves are transmitted to one area, vector superposition occurs on the electromagnetic waves according to a superposition principle. A superposition result not only relates to an amplitude of each of the electromagnetic waves, but also relates to a phase difference between the electromagnetic waves in an encounter section. A space phase difference is caused when electromagnetic waves transmitted by transmit antennas in different positions are delivered to one receiving area. Therefore, the following two situations are bound to occur on several electromagnetic waves in an encounter area: in-phase superposition, causing an increase in total field strength; out-of-phase superposition, causing a decrease in total field strength. If increase and decrease areas of the total field strength remain relatively unchanged in space, this is equivalent to changing a radiation field structure of a single antenna by using an antenna array. This is the principle of how the antenna array changes a size and directivity of a radiation field.

Currently, channel state information (CSI) measurement may be measurement of instantaneous CSI, for example, measurement of a channel itself, or may be measurement of statistical CSI, for example, measurement of a channel autocorrelation matrix. For a massive antenna array, the meaning of measurement lies more in statistically processing the channel, including dimension reduction and grid of beam (GOB).

Typically, when the massive antenna array performs transmission according to a frequency division duplex (FDD) standard or a time division duplex (TDD) standard, CSI is obtained mainly by means of downlink measurement and user equipment (User equipment, UE) feedback. Specifically, in Long Term Evolution (LTE)/LTE-A, UE obtains a rank indicator (Rank indicator, RI) and a precoding matrix indicator (PMI) according to channel information obtained by means of downlink measurement, quantizes the RI and the PMI according to a preset precoding codebook, and then feeds back quantized RI and PMI to a base station, so as to determine a precoding matrix. After receiving the RI and the PMI, the base station sends data and a cell-specific reference signal (CRS) used for demodulation or a demodulation reference symbol (DM-RS).

A first example of the present disclosure provides a channel information feedback method for an antenna array, so as to obtain channel information of a channel between an antenna array of a first network device and an antenna array of a second network device.

The first network device may be a network device in one of the following forms: a macro base station, a micro base station, user equipment, and the like. The antenna array of the first network device includes M subarrays. The second network device may be user equipment, for example, a portable device such as a mobile telephone or a tablet computer. With development of the Internet of Things in the future, the second network device may alternatively be a terminal with an antenna, for example, a smart appliance such as a smart refrigerator or a smart television.

Figure 1:
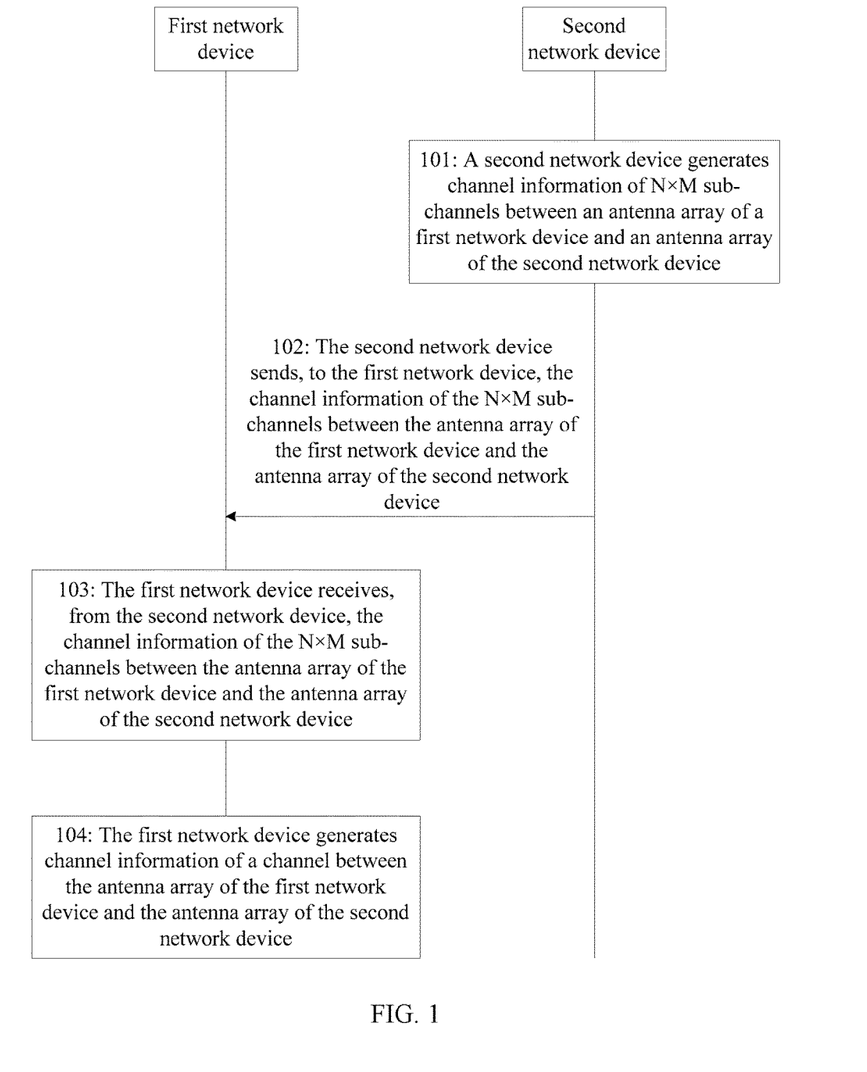
FIG. 1 is a schematic flowchart of a method for feeding back information about a channel between antenna arrays according to an example of the present disclosure.

Referring to FIG. 1, an implementation process of the method for feeding back information about a channel between antenna arrays in this example of the present disclosure includes the following steps.

101: The second network device generates channel information of N×M sub-channels between the antenna array of the first network device and the antenna array of the second network device.

Figure 2:
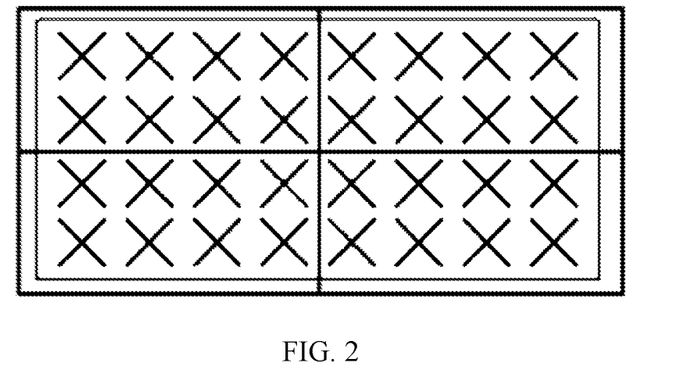
FIG. 2 is a schematic diagram of antenna array division according to the example shown in FIG. 1 of the present disclosure.

The antenna array of the first network device includes M subarrays, and the antenna array of the second network device includes N subarrays. M and N are positive integers and are not both 1. The M subarrays and the N subarrays each include at least two antennas. All antenna subarrays in a typical antenna array include same quantities of antennas and are symmetrically deployed. The antenna array of the first network device is used as an example for description. Referring to FIG. 2, assuming that the antenna array includes 36 antennas and the antenna array of the first network device is divided into four subarrays, each subarray includes eight antennas, and the four subarrays are symmetrically deployed. It can be understood that a configuration rule is not limited thereto. In another example, subarrays may include different quantities of antennas and may be deployed asymmetrically.

Corresponding to M sub-channels of the first network device and N sub-channels of the second network device, there are N×M sub-channels between the antenna array of the first network device and the antenna array of the second network device.

Specifically, the channel information of the N×M sub-channels between the antenna array of the first network device and the antenna array of the second network device includes a rank indicator RI and a precoding matrix indicator PMI or includes precoding. The second network device can obtain the channel information of the N×M sub-channels in response to a reference signal (RS) from the first network device, or can obtain, based on channel reciprocity, the channel information of the N×M sub-channels.

In this example, it is assumed that K=N×M. The channel information of the K sub-channels is obtained according to the following steps:

obtaining autocorrelation matrices of channel matrices of the K sub-channels, where for example, according to preset subarray configuration information, the channel between the first network device and the second network device is divided into the K sub-channels:

$$H=(H_1,H_2,\ldots,H_k,\ldots H_K),$$

where a dimension of $H_k$ is $L \times M_k$, $$\sum_k M_k = M,$$

and $M_k$ is a quantity of antenna ports in the $k^{th}$ antenna group; and obtaining $RI_k$ and $PMI_k$ of the K sub-channels according to the autocorrelation matrices of the channel matrices of the K sub-channels. For example, steps of obtaining the RI and the PMI of the K sub-channels include:

obtaining, by the second network device, autocorrelation matrices of the K sub-channels according to the K sub-channels; and performing eigenvalue decomposition (EVD) or singular value decomposition (SVD) on the autocorrelation matrices corresponding to the K sub-channels, to obtain corresponding precoding $U_k$.

The second network device can feed back the precoding $U_k$ corresponding to the K sub-channels to the first network device; or quantize a codebook corresponding to the $U_k$ to obtain $RI_k$ and $PMI_k$ of the K sub-channels, and feed back the $RI_k$ and the $PMI_k$ to the first network device. Specifically, a dimension of each codeword in a precoding codebook used by the first network device and the second network device is $M_k \times r$, where $M_k$ is a quantity of antenna ports in the $k^{th}$ antenna group, and r is a quantity of flows.

It can be learnt that, when the first network device has a relatively large quantity of antennas, complexity of the SVD or EVD is relatively high. Dividing the antenna array of the first network device and the antenna array of the second network device into groups can significantly reduce the complexity of the SVD or EVD.

102: The second network device sends, to the first network device, the channel information of the N×M sub-channels between the antenna array of the first network device and the antenna array of the second network device.

103: The first network device receives, from the second network device, the channel information of the N×M sub-channels between the antenna array of the first network device and the antenna array of the second network device.

104: The first network device generates the channel information of the channel between the antenna array of the first network device and the antenna array of the second network device according to the channel information, from the second network device, of the N×M sub-channels between the antenna array of the first network device and the antenna array of the second network device. Optionally, when the channel information, received by the first network device, of the N×M sub-channels is the precoding $U_k$, the first network device obtains precoding U of the channel between the antenna array of the first network device and the antenna array of the second network device according to the precoding $U_k$ of the K sub-channels. Specifically, U is obtained according to the following expression:

$$U = \begin{bmatrix} U_1 & & & \\ & U_2 & & \\ & & \ddots & \\ & & & U_K \end{bmatrix}$$

The first network device quantizes the precoding U to obtain RI and PMI of the channel between the antenna array of the first network device and the antenna array of the second network device. When the channel information, received by the first network device, of the N×M sub-channels is the rank indicator $RI_k$ and the precoding matrix indicator $PMI_k$, the RI and the PMI of the channel between the antenna array of the first network device and the antenna array of the second network device are obtained by combining the rank indicator $RI_k$ and the precoding matrix indicator $PMI_k$ of the K sub-channels or by means of a capacity maximization algorithm or another algorithm.

Figure 3:
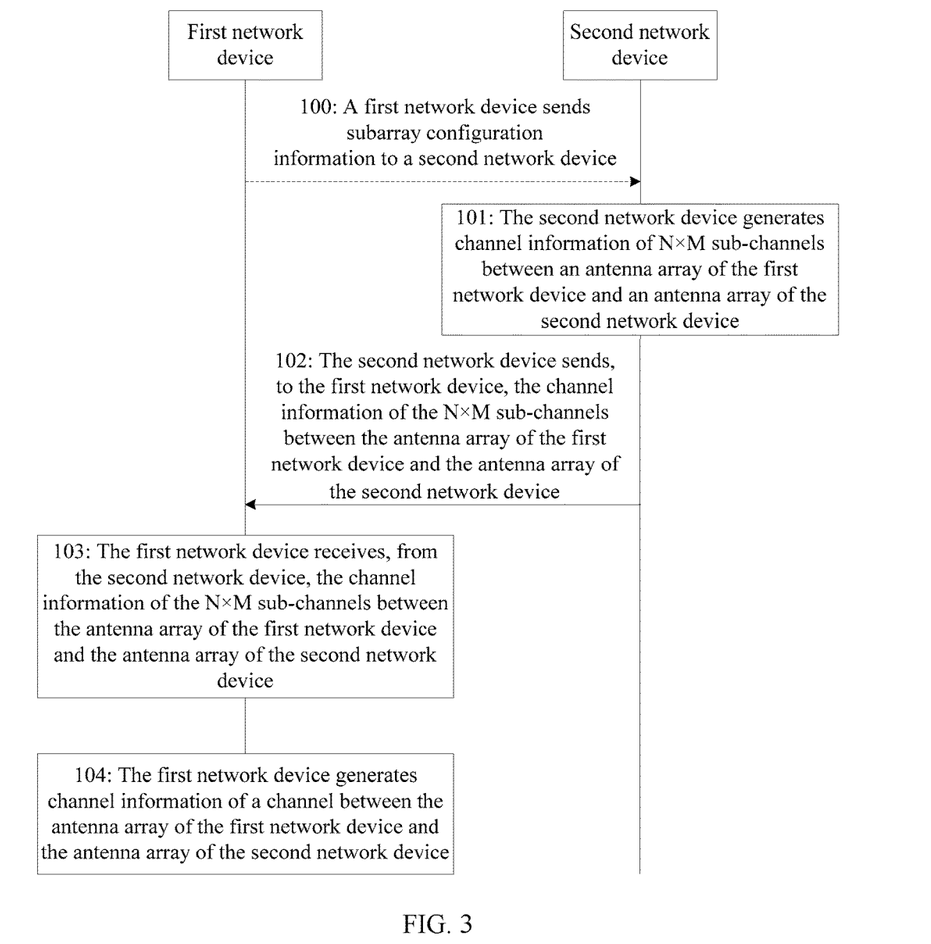
FIG. 3 is a schematic flowchart of a method for feeding back information about a channel between antenna arrays according to another example of the present disclosure.

Referring to FIG. 3, in another example, optionally, the method for feeding back information about a channel between antenna arrays further includes:

100: The first network device sends subarray configuration information to the second network device, where the subarray configuration information is used to divide the antenna array of the first network device into the M subarrays, and M is a positive integer greater than 2.

Optionally, step 100 is performed before step 101, and the subarray configuration information is used to preset the antenna array of the first network device.

Optionally, step 100 is performed after step 103, and the subarray configuration information is used to dynamically update the antenna array of the first network device. Specifically, when division of the antenna array of the first network device changes, the first network device sends the subarray configuration information to the second network device. The subarray configuration information can be sent by using a physical downlink control channel (PDCCH), Radio Link Control (RLC) signaling, or a physical broadcast channel (PBCH).

Regardless of whether the subarray configuration information is used to preset the antenna array of the first network device or to dynamically update the antenna array of the first network device, the subarray configuration information includes a subarray division rule. The antenna array of the first network device is divided according to the preset rule included in the subarray configuration information. Optionally, in another example, the preset rule is numbered, so that the first network device informs the second network device of the used preset rule by sending the number.

For example, the preset rule includes at least one pattern, and the N subarrays of the antenna array of the second network device are determined according to the at least one pattern. Referring to FIG. 2, as an example of a pattern, the antenna array of the first network device is divided into four subarrays.

For example, the preset rule is a start port number of each subarray, and each of the N subarrays of the antenna array of the first network device is determined according to the start port number.

In this example, an antenna array of a first network device and an antenna array of a second network device are divided into multiple antenna subarrays, channel information of multiple sub-channels that correspond to the multiple antenna subarrays and that are between the antenna array of the first network device and the antenna array of the second network device is obtained, and channel information of a channel between the antenna array of the first network device and the antenna array of the second network device is obtained according to the channel information of the multiple sub-channels. In this way, complexity of obtaining channel information is reduced, and system efficiency is improved.

Figure 4:
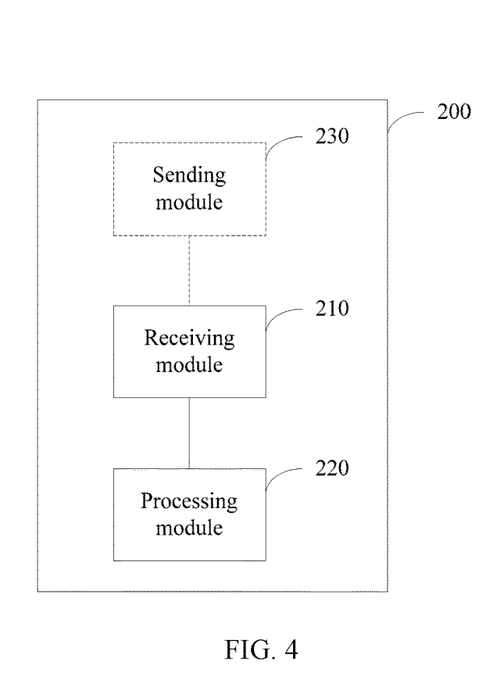
FIG. 4 is a schematic diagram of an apparatus for feeding back information about a channel between antenna arrays according to an example of the present disclosure.

Another example of the present disclosure provides an apparatus for feeding back information about a channel between antenna arrays. The apparatus is applied to a first network device and is configured to perform step 103 and step 104. Referring to FIG. 4, an apparatus 200 for feeding back information about a channel between antenna arrays includes a receiving module 210 and a processing module 220.

The receiving module 210 is configured to receive channel information of N×M sub-channels that is sent by a second network device. An antenna array of the first network device includes M subarrays. An antenna array of the second network device includes N subarrays. A channel between the antenna array of the first network device and the antenna array of the second network device includes the N×M sub-channels. M and N are positive integers and are not both 1. The M subarrays and the N subarrays each include at least two antennas.

The processing module 220 is configured to generate channel information of the channel between the antenna array of the first network device and the antenna array of the second network device according to the channel information of the N×M sub-channels that is from the receiving module.

Specifically, the sub-channel information of the N×M sub-channels includes a rank indicator RI and a precoding matrix indicator PMI.

Optionally, in another implementation manner, the apparatus for feeding back information about a channel between antenna arrays is further configured to perform the foregoing step 100. Referring to FIG. 4, the apparatus 200 further includes a sending module 230.

The sending module 230 is configured to send subarray configuration information to the second network device. The subarray configuration information is used to divide the antenna array of the first network device into the M subarrays, and M is a positive integer greater than or equal to 2. Specifically, the subarray configuration information can be sent by the sending module 230 by using a PDCCH, RLC signaling, or a PBCH.

For example, the subarray configuration information includes at least one pattern, and the M subarrays of the antenna array of the first network device are determined according to the at least one pattern.

For example, the subarray configuration information includes a start port number of each subarray, and the M subarrays of the antenna array of the first network device are determined according to the start port number of each subarray.

Figure 5:
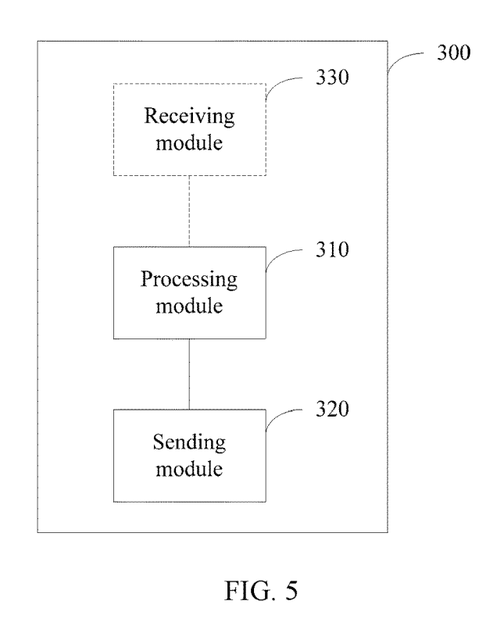
FIG. 5 is a schematic diagram of an apparatus for feeding back information about a channel between antenna arrays according to another example of the present disclosure.

Another example of the present disclosure provides an apparatus for feeding back information about a channel between antenna arrays. The apparatus is applied to a second network device and is configured to perform step 101 and step 102. Referring to FIG. 5, an apparatus 300 for feeding back information about a channel between antenna arrays includes a processing module 310 and a sending module 320.

The processing module 310 is configured to generate channel information of N×M sub-channels of a channel between an antenna array of a first network device and an antenna array of the second network device. The antenna array of the first network device includes M subarrays. The antenna array of the second network device includes N subarrays. M and N are positive integers and are not both 1. The M subarrays and the N subarrays each include at least two antennas.

Specifically, the channel information of the N×M sub-channels between the antenna array of the first network device and the antenna array of the second network device includes a rank indicator RI and a precoding matrix indicator PMI. The processing module 310 can obtain the channel information of the N×M sub-channels in response to a reference signal (RS) from the first network device, or can obtain, based on channel reciprocity, the channel information of the N×M sub-channels.

The sending module 320 is configured to send the channel information of the N×M sub-channels to the first network device, so that the first network device generates channel information of the channel between the antenna array of the first network device and the antenna array of the second network device according to the channel information of the N×M sub-channels.

Optionally, in another implementation manner, referring to FIG. 5, the apparatus 300 for feeding back information about a channel between antenna arrays includes a receiving module 330.

The receiving module 330 is configured to receive sub-array configuration information sent by the first network device. The subarray configuration information is used to divide the antenna array of the first network device into the M subarrays, and M is a positive integer greater than 2. Specifically, the subarray configuration information can be received by the receiving module 330 by using a PDCCH, or by receiving RLC signaling, or by using a PBCH.

For example, the subarray configuration information includes at least one pattern, and the M subarrays of the antenna array of the first network device are determined according to the at least one pattern.

For example, the subarray configuration information includes a start port number of each subarray, and the M subarrays of the antenna array of the first network device are determined according to the start port number of each subarray.

In addition, modules in the examples of the present disclosure may be integrated into one processing module, or each of the modules may exist alone physically, or two or more modules are integrated into one module. The integrated module may be implemented in a form of hardware, or may be implemented in a form of a software function module. Steps of the methods disclosed with reference to the examples of the present disclosure may be directly executed and accomplished by using a hardware encoding processor, or may be executed and accomplished by using a combination of hardware in the encoding processor and a software module. The software module may be located in a storage medium, such as a random access memory, a flash memory, a read-only memory, a programmable read-only memory, an electrically erasable programmable memory, a register, or the like.

If the modules or the integrated modules are implemented in the form of hardware, the modules or the integrated modules may be integrated circuits (ICs), application-specific integrated circuits (ASICs), field-programmable gate arrays (FPGAs), or the like, or may be integrated into a baseband processor or a general-purpose processor.

When the modules or the integrated modules are implemented in the form of a software function module and are sold or used as independent products, the modules or the integrated modules may be stored in a computer-readable storage medium. Based on such an understanding, the technical solutions of the present disclosure, or all or a part of the technical solutions may be implemented in a form of a software product. The software product is stored in a storage medium and includes several instructions for instructing a computer device (which may be a personal computer, a server, or a network device) to perform all or some of the steps of the methods described in the examples of the present disclosure. The foregoing storage medium includes any medium that can store program code, such as a USB flash drive, a removable hard disk, a read-only memory (ROM), a random access memory (RAM), a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The foregoing descriptions are merely specific examples of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for feeding back information about a channel between antenna arrays, comprising:
receiving, by a first network device, sub-channel channel information of a N×M sub-channels that is sent by a second network device, wherein an antenna array of the first network device comprises M subarrays, an antenna array of the second network device comprises N subarrays, the channel between the antenna array of the first network device and the antenna array of the second network device comprises the N×M sub-channels, and M and N are positive integers and M and N are not to be 1 at the same time;

generating channel information of the channel between the antenna array of the first network device and the antenna array of the second network device according to the sub-channel channel information of the N×M sub-channels that is from the second network device; and sending, by the first network device, subarray configuration information to the second network device, wherein the subarray configuration information is used to divide the antenna array of the first network device into the M subarrays, and M is a positive integer that is greater than or equal to 2 and the M subarrays and the N subarrays each comprise at least two antennas.

2. The method according to claim 1, wherein the subarray configuration information comprises at least one pattern, and the M subarrays are determined according to the at least one pattern.

3. The method according to claim 1, wherein the subarray configuration information comprises a start port number of each subarray, and each of the M subarrays is determined according to the start port number.

4. A method for feeding back information about a channel between antenna arrays, comprising:

generating, by a second network device, sub-channel channel information of N×M sub-channels of the channel between an antenna array of a first network device and an antenna array of the second network device, wherein the antenna array of the first network device comprises M subarrays, the antenna array of the second network device comprises N subarrays, and M and N are positive integers and M and N are not to be 1 at the same time;

sending the sub-channel channel information of the N×M sub-channels to the first network device, so that the first network device generates channel information of the channel between the antenna array of the first network device and the antenna array of the second network device according to the sub-channel channel information of the N×M sub-channels; and receiving, by the second network device, subarray configuration information sent by the first network device, wherein the subarray configuration information is used to divide the antenna array of the first network device into the M subarrays, and M is a positive integer greater than or equal to 2 and the M subarrays and the N subarrays each comprise at least two antennas.

5. The method according to claim 4, wherein the sub-channel channel information of the N×M sub-channels comprises a rank indicator RI and a precoding matrix indicator PMI, each of the N×M sub-channels corresponds to one sub-channel matrix, and the sub-channel channel information of the N×M sub-channels is obtained according to the following steps:

obtaining autocorrelation matrices of A N×M sub-channels matrices; and obtaining the RI and the PMI of the N×M sub-channels according to the autocorrelation matrices of the N×M sub-channels matrices.

6. The method according to claim 4, wherein the sub-channel channel information of the N×M sub-channels comprises precoding in the form of a precoding matrix, each of the N×M sub-channels corresponds to one sub-channel matrix, and the generating, by the second network device, the sub-channel channel information of N×M sub-channels of the channel between the antenna array of the first network device and the antenna array of the second network device comprises:

obtaining autocorrelation matrices of a N×M sub-channels matrices; and obtaining the precoding of the N×M sub-channels matrices according to the autocorrelation matrices of the channel matrices of the N×M sub-channels matrices.

7. The method according to claim 6, wherein the subarray configuration information comprises at least one pattern, and the N subarrays are determined according to the at least one pattern.

8. The method according to claim 6, wherein the subarray configuration information comprises a start port number of each subarray, and the M subarrays are determined according to the start port number of each subarray.

9. An apparatus for feeding back information about a channel between antenna arrays, comprising: a processor and a non-transitory computer-readable medium storing instructions that are executable by the processor, wherein the processor is configured to:

receive sub-channel channel information of N×M sub-channels that is sent by a second network device, wherein an antenna array of a first network device comprises M subarrays, an antenna array of the second network device comprises N subarrays, a channel between the antenna array of the first network device and the antenna array of the second network device comprises the N×M sub-channels, M and N are positive integers and M and N are not to be 1 at the same time;

generate channel information of the channel between the antenna array of the first network device and the antenna array of the second network device according to the received sub-channel channel information of the N×M sub-channels; and send subarray configuration information to the second network device, the subarray configuration information is used to divide the antenna array of the first network device into the M subarrays, and M is a positive integer greater than or equal to 2 and the M subarrays and the N subarrays each comprise at least two antennas.

10. The apparatus according to claim 9, wherein the subarray configuration information comprises at least one pattern, and the M subarrays are determined according to the at least one pattern.

11. The apparatus according to claim 9, wherein the subarray configuration information comprises a start port number of each subarray, and the M subarrays are determined according to the start port number of each subarray.

12. An apparatus for feeding back information about a channel between antenna arrays, comprising: a processor and a non-transitory computer-readable medium storing instructions that are executable by the processor, wherein the processor is configured to:

generate sub-channel channel information of N×M sub-channels of the channel between an antenna array of a first network device and an antenna array of a second network device, wherein the antenna array of the first network device comprises M subarrays, the antenna array of the second network device comprises N subarrays, and M and N are positive integers and M and N are not to be 1 at the same time;

send the sub-channel channel information of the N×M sub-channels to the first network device, so that the first network device generates channel information of the channel between the antenna array of the first network device and the antenna array of the second network device according to the sub-channel channel information of the N×M sub-channels; and receive subarray configuration information sent by the first network device, wherein the subarray configuration information is used to divide the antenna array of the first network device into the M subarrays, and M is a positive integer greater than or equal to 2 and the M subarrays and the N subarrays each comprise at least two antennas.

13. The apparatus according to claim 12, wherein the sub-channel channel information of the N×M sub-channels comprises a rank indicator RI and a precoding matrix indicator PMI, each of the N×M sub-channels corresponds to one sub-channel matrix, and the processor is further configured to:
   obtain autocorrelation matrices of a N×M sub-channels matrices; and
   obtain the RI and the PMI of the N×M sub-channels according to the autocorrelation matrices of the N×M sub-channels matrices.

14. The apparatus according to claim 12, wherein the sub-channel channel information comprises a precoding in the form of a precoding matrix, each of the N×M sub-channels corresponds to one sub-channel matrix, and the processor is further configured to:
   obtain autocorrelation matrices of a N×M sub-channels matrices; and
   obtain the precoding of the N×M sub-channels according to the autocorrelation matrices of the N×M sub-channels matrices.

15. The apparatus according to claim 12, wherein the subarray configuration information comprises at least one pattern, and the N subarrays are determined according to the at least one pattern.

16. The apparatus according to claim 12, wherein the subarray configuration information comprises a start port number of each subarray, and the M subarrays are determined according to the start port number of each subarray.

* * * * *